(12) United States Patent
Kessinger et al.

(10) Patent No.: US 7,573,998 B2
(45) Date of Patent: Aug. 11, 2009

(54) METHODS AND SYSTEMS FOR MANAGEMENT OF DATA FOR MULTIPLE CALL CENTERS

(75) Inventors: Kevin Kessinger, Kansas City, MO (US); Richard Garside, Jacksonville, FL (US); Louis Savoldy, Jacksonville, FL (US); Mahendra Govada, St. Augustine, FL (US); Joe Begley, Jacksonville, FL (US); Ryan Kaminski, Jacksonville, FL (US)

(73) Assignee: Citicorp Credit Services, Inc., Long Island City, NY (US)

( * ) Notice: Subject to any disclaimer, the term of this patent is extended or adjusted under 35 U.S.C. 154(b) by 603 days.

(21) Appl. No.: 11/152,080

(22) Filed: Jun. 15, 2005

(65) Prior Publication Data
US 2006/0115072 A1 Jun. 1, 2006

Related U.S. Application Data

(60) Provisional application No. 60/579,632, filed on Jun. 15, 2004.

(51) Int. Cl.
*H04M 3/00* (2006.01)
(52) U.S. Cl. ............................ 379/265.01; 379/265.02; 379/265.06; 379/266.01; 379/266.1; 379/309
(58) Field of Classification Search ............ 379/265.01, 379/265.02, 265.06, 266.01, 266.1, 309
See application file for complete search history.

(56) References Cited

U.S. PATENT DOCUMENTS

| | | | |
|---|---|---|---|
| 3,525,814 A | 8/1970 | Cox | 179/18 |
| 4,510,351 A | 4/1985 | Costello et al. | 179/27 D |
| 5,450,482 A * | 9/1995 | Chen et al. | 379/230 |
| 5,465,286 A * | 11/1995 | Clare et al. | 379/32.04 |
| 5,940,494 A | 8/1999 | Rafacz et al. | 379/265 |
| 5,960,442 A | 9/1999 | Pickering | 707/104 |
| 6,044,355 A * | 3/2000 | Crockett et al. | 705/8 |
| 6,294,982 B1 | 9/2001 | Hooks et al. | 340/286.02 |
| 6,373,836 B1 | 4/2002 | Deryugin et al. | 370/352 |
| 6,392,666 B1 | 5/2002 | Hong et al. | 345/736 |
| 6,466,663 B1 | 10/2002 | Ravenscroft et al. | 379/265 |
| 6,490,350 B2 | 12/2002 | McDuff et al. | 379/265.06 |
| 6,526,397 B2 | 2/2003 | Chee et al. | 707/1 |

(Continued)

OTHER PUBLICATIONS

"Centergistic Solutions' AgentView® EPM Improves Performance and Productivity for Nortel Contact Centers" [online], Copyright 2005 [retrieved on Apr. 26, 2005], 2 pp., Retrieved from the Internet: http://www.nortelnetworks.com/prd/dpp/product/prodpages/collateral/agentviewepm_centerstats.pdf.

(Continued)

*Primary Examiner*—Quynh H Nguyen
(74) *Attorney, Agent, or Firm*—George T. Marcou; King & Spalding LLP

(57) ABSTRACT

Computer-implemented methods and systems for management of real-time and historical data for multiple call centers in which real-time and historical data are received electronically from a plurality of call center sites and displayed simultaneously for each of the plurality of call center sites on a single display screen in a separate call center site column for each call center and integrated and displayed for all of the plurality of call center sites in a separate division column on the single display screen.

1 Claim, 3 Drawing Sheets

U.S. PATENT DOCUMENTS

| | | | |
|---|---|---|---|
| 6,574,605 B1 | 6/2003 | Sanders et al. | 705/8 |
| 6,584,191 B1 | 6/2003 | McPartlan et al. | 379/265.02 |
| 6,594,470 B1 | 7/2003 | Barnes et al. | 455/67.7 |
| 6,611,590 B1 | 8/2003 | Lu et al. | 379/265.09 |
| 6,707,904 B1 | 3/2004 | Judkins et al. | 379/265.06 |
| 6,735,299 B2 | 5/2004 | Krimstock et al. | 379/265.11 |
| 6,744,878 B1 | 6/2004 | Komissarchik et al. | 379/265.03 |
| 6,856,680 B2 | 2/2005 | Mengshoel et al. | 379/265.06 |
| 6,918,536 B2 * | 7/2005 | Nozaki et al. | 235/379 |
| 2002/0175929 A1 | 11/2002 | Hunt et al. | 345/704 |
| 2002/0175943 A1 * | 11/2002 | Hunt et al. | 345/771 |
| 2003/0033402 A1 | 2/2003 | Battat et al. | 709/224 |

OTHER PUBLICATIONS

"DeskView—Windows Delivery Options" [online], White Paper, Symon Communications, Inc., Oct. 2003 [retrieved on Apr. 26, 2005], 3 pp., Retrieved from the Internet: www.symon.com.

"Inova Desktop Presenter—Align Actions with Performance Goals and Increase Productivity with Real-Time Information Delivered to the Desktop" [online], Copyright 2004 [retrieved on Apr. 26, 2005], 2 pp., Retrieved from the Internet: http://www.inovasolutions.com/solutions/performance/tracker.htm.

Inova Performance Tracker, "Business Intelligence Dashboards" [online], [retrieved on Apr. 26, 2005], 1 p., Retrieved from the Internet: http://www.inovasolutions.com/solutions/performance/tracker.htm.

Texas Digital Systems, Inc., "QuickCOM Enterprise" [online], Copyright 2005 [retrieved on Apr. 26, 2005], 6 pp., Retrieved from the Internet: www.txdigital.com.

O'Herron, Jennifer, "Make Your Center A Room With A View," *Call Center Magazine*, vol. 17, No. 8, p. 38(7), Aug. 2004.

Fleischer, J., "Distinguishing Displays," *Call Center Magazine*, vol. 16, No. 8, p. 36(7), Aug. 2003.

* cited by examiner

| Site | CITI-DE | CITI-JX | CITI-KY | CITI-MD | CITI-MO | CITI-NM | CITI-NV | CITI-NV2 | CITI-SD | CITI-TP | CITI-TX | CITI-DIV |
|---|---|---|---|---|---|---|---|---|---|---|---|---|
| Calls Offered | 162 | 152 | 307 | 188 | 265 | 113 | 140 | 84 | 229 | 136 | 238 | 2014 |
| Forecast This Half | | | | | | | | | | | | 7920 |
| Projected Vol This Half | | | | | | | | | | | | 6788 |
| Projected Vol O/U Fcst | | | | | | | | | | | | (14.3%) |
| Staff Logged On | 34 | 57 | 143 | 81 | 127 | 50 | 70 | 57 | 89 | 90 | 100 | 898 |
| Scheduled Staff | 25 | 77 | 139 | 68 | 133 | 43 | 62 | 52 | 92 | 63 | 63 | 817 |
| Staff ON vs Sched Variance | 9 | (20) | 4 | 13 | (6) | 7 | 8 | 5 | (3) | 27 | 37 | 81 |
| Staff Variance % | 36% | (25%) | 2% | 19% | (4%) | 16% | 12% | 9% | (3%) | 42% | 58% | 9% |
| Base Staff Available | 0 | 0 | 1 | 0 | 3 | 0 | 4 | 0 | 1 | 0 | 2 | 11 |
| Scheduled Off | 15 | 1 | 22 | 14 | 38 | 29 | 5 | 0 | 5 | 2 | 15 | 146 |
| Forecast Update Time | 14:32 | 14:34 | 14:35 | 14:34 | 14:34 | 14:35 | 14:06 | 14:02 | 14:34 | 14:30 | 14:26 | 14:35 |
| ASA | 15 | 0 | 5 | 6 | 4 | 0 | 2 | 3 | 17 | 4 | 2 | 6 |
| Calls In Queue / Pct in Q | 3 | 2 | 3 | 6 | 3 | 1 | 1 | 1 | 8 | 2 | 1 | 31/3.5% |
| Oldest Call Waiting | 59 | 5 | 15 | 26 | 22 | 2 | 8 | 25 | 116 | 5 | 51 | 116 |
| Handle Time | 208.57 | 237.81 | 275.50 | 253.65 | 250.50 | 341.88 | 261.74 | 307.01 | 214.23 | 291.64 | 266.84 | 259.28 |
| Forecast Handle Time | | | | | | | | | | | | 237.44 |
| Data Link Read/Combine Time | 14:38:53 | 14:38:54 | 14:38:51 | 14:38:46 | 14:38:52 | 14:38:51 | 14:38:52 | 14:38:53 | 14:38:49 | 14:38:54 | 14:38:54 | 14:38:54 |
| CMS Timeclock | 14:40:22 | 14:39:21 | 14:39:34 | 14:39:03 | 14:38:45 | 14:38:14 | 14:39:06 | 14:39:07 | 14:38:17 | 14:40:31 | 14:38:38 | 14:39:09 |

METHODS AND SYSTEMS FOR MANAGEMENT OF DATA FOR MULTIPLE CALL CENTERS

PRIORITY APPLICATION

This application claims priority to co-pending U.S. Provisional Application No. 60/579,632, filed Jun. 15, 2004, entitled "METHODS AND SYSTEMS FOR MANAGEMENT OF DATA FOR MULTIPLE CALL CENTERS", which is incorporated herein by this reference.

FIELD OF THE INVENTION

The present invention relates generally to the field of data management, and more particularly to methods and systems for management of real-time and historical data for multiple call centers.

BACKGROUND OF THE INVENTION

An entity, such as a financial institution, can have multiple call centers at which there are numerous customer service and other types of agents that take inbound calls. Typically, customers of the entity reach the call centers by dialing an 800 number for customer service. Although some customers may have other reasons for calling the call centers, customer service is the main reason for calling them. All of those calls go first to an automated answering system known as a network interactive voice response (NIVR) system, and out of that system, a customer needs to speak to a live agent. The customers' calls are then routed to one of many sites maintained by the entity.

For example, customer service calls may be routed to one of ten or more different sites spread out all over the country. Each of those sites has a call management system (CMS) that is coupled very closely with the private branch exchange (PBX) system for the particular site. The CMS constantly gathers real time information about the number of calls that have been received and the number of calls that are presently in queue. The CMS also collects information about the individual agents, so it is possible to see, for example, the number of agents that are currently logged in, their average time to handle a call, the average length of a call, and the like.

The CMS itself provides both real-time and historical reporting, but it is limited to the particular PBX system to which it is connected. There may be some variation in how different sites use CMS and how it is connected to the sites' PBXs. For example, at some sites there may be one CMS per PBX, and at other sites there can be one CMS and many PBX's. By and large, however, with multiple sites (e.g., ten or more sites), it is not feasible to have a single CMS connected to all of those sites' PBX systems. Thus, it is not presently practical for management of an entity with multiple call centers, which needs to know how the entity is performing as far as how well customers' calls are being handled, to view a single screen to see the status of all of the entity's call centers at one time.

While an entity with only one call center may be able to use CMS to monitor the status of the particular call center on a single screen, it would be necessary for management of an entity with multiple different call centers, for example, to log in separately to each one of multiple different CMS's and attempt to have multiple different windows open on their screen at once and refer back and forth between the screen to observe the status of all the different call centers, but with no way to integrate the information on the different windows.

A similar situation has existed with another source system used by management of an entity to monitor its call centers, an example of which is eWorkforce Management available from Aspect, referred to herein as "TCS" or "the TCS system". TCS provides a prediction or forecasting type of information regarding the performance of the entity's call centers. TCS is used for forecasts, such as the number of calls that will be received at a particular call center on a particular day and thus the number of agents which should be scheduled by the entity to work on the particular day, and similar forecasts for management of the entity.

SUMMARY OF THE INVENTION

It is a feature and advantage of the present invention to provide methods and systems for management of real-time and historical data for multiple call centers that pulls real-time and historical data from other systems to provide a single view of the current state of all of a number of call centers of an entity, such as a financial institution.

It is an additional feature and advantage of the present invention to provide methods and systems for management of real-time and historical data for multiple call centers that shows pertinent information about each call center, such as the number of agents that are currently logged in vs. the number of agents that were scheduled to be logged in, the number of calls that have been answered in the current half hour vs. the number of calls that were forecast to be answered, the number of calls that are in queue (i.e., on hold waiting for a live agent), and the like.

It is a further feature and advantage of the present invention to provide methods and systems for management of real-time and historical data for multiple call centers that shows such information in total for all call center sites with a breakout showing each individual site.

It is another feature and advantage of the present invention to provide methods and systems for management of real-time and historical data for multiple call centers that also provides standard reports for similar information for a predetermined number of the past days.

It is an additional feature and advantage of the present invention to provide methods and systems for management of real-time and historical data for multiple call centers that enables a user to simultaneously see such information about all sites in a single window.

To achieve the stated and other features, advantages and objects, embodiments of the invention make use, for example, of computer hardware and software including, without limitation, machine-readable medium on which is encoded program code for management of real-time and historical data for multiple call centers that pulls real-time and historical data from other systems to provide a single view of the current state of all of a number of call centers of an entity, such as a financial institution. The system of an embodiment of the invention ("the division monitor system") shows pertinent information about each call center, such as the number of agents that are currently logged in vs. the number of agents that were scheduled to be logged in, the number of calls that have been answered in the current half hour vs. the number of calls that were forecast to be answered, the number of calls that are in queue (i.e., on hold waiting for a live agent), and the like. Most of such information is shown in total for all call center sites with a breakout showing each individual site. The division monitor system also provides standard reports for similar information for a predetermined number of the past days, such as 400 past days. An important benefit of the division monitor system is being able to simultaneously see all sites in a single window.

In particular, embodiments of the invention provide computer-implemented methods and systems for management of real-time and historical data for multiple call centers in which real-time and historical data are received electronically from a plurality of call center sites and displayed for each of the plurality of call center sites simultaneously on a single display screen in a separate call center site column for each call center and integrated and displayed for all of the plurality of call center sites in a separate division column on the single display screen.

The displayed data includes, for example, a number of calls offered during a current pre-determined time interval for each site and a total number of the calls offered for all sites and a number of calls forecast for a current interval, a projected volume of calls predicted at a current rate for the current interval, a difference between the number of calls forecast and projected volume of calls for the current interval for each site and a total number of calls forecast and projected volume and total difference for the current interval for all sites.

Additional examples of the displayed data include a number of agents logged on at each site and a total number of the agents logged on at all sites, a number of agents scheduled to be logged on at each site and a total number of the agents scheduled at all sites, a difference between the number of agents logged on and scheduled to be logged on for each site, and a total difference between the number of agents logged on and scheduled to be logged on for all sites. Further examples of the displayed data include a number of agents currently logged on and awaiting a next call at each site and a total number of staff currently logged on and awaiting a next call at all sites, and a number of agents at each site that are not scheduled to be logged on and a total number of agents at all sites that are not scheduled to be logged on.

Other examples of the displayed data include a 'time stamp' for a most recent feed from a forecasting system for each site and for a most recent feed from any site, an average speed of call answering for each site, a number of calls currently in queue for each site, and a percentage of all calls that are currently in queue, a time in queue for an oldest call for each site, an average call handle time for each site for the current interval, and a forecast of a call handle time for all call center sites, and a server clock showing a time that displayed information was compiled for each site and a call management system clock for each site illustrating a degree of synchronization between call management systems for all sites.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWINGS

FIG. 1 is a sample GUI screen displaying data received from both TCS and CMS for multiple different call centers and merged into a single screen window for an embodiment of the invention;

DETAILED DESCRIPTION

Figure 2:
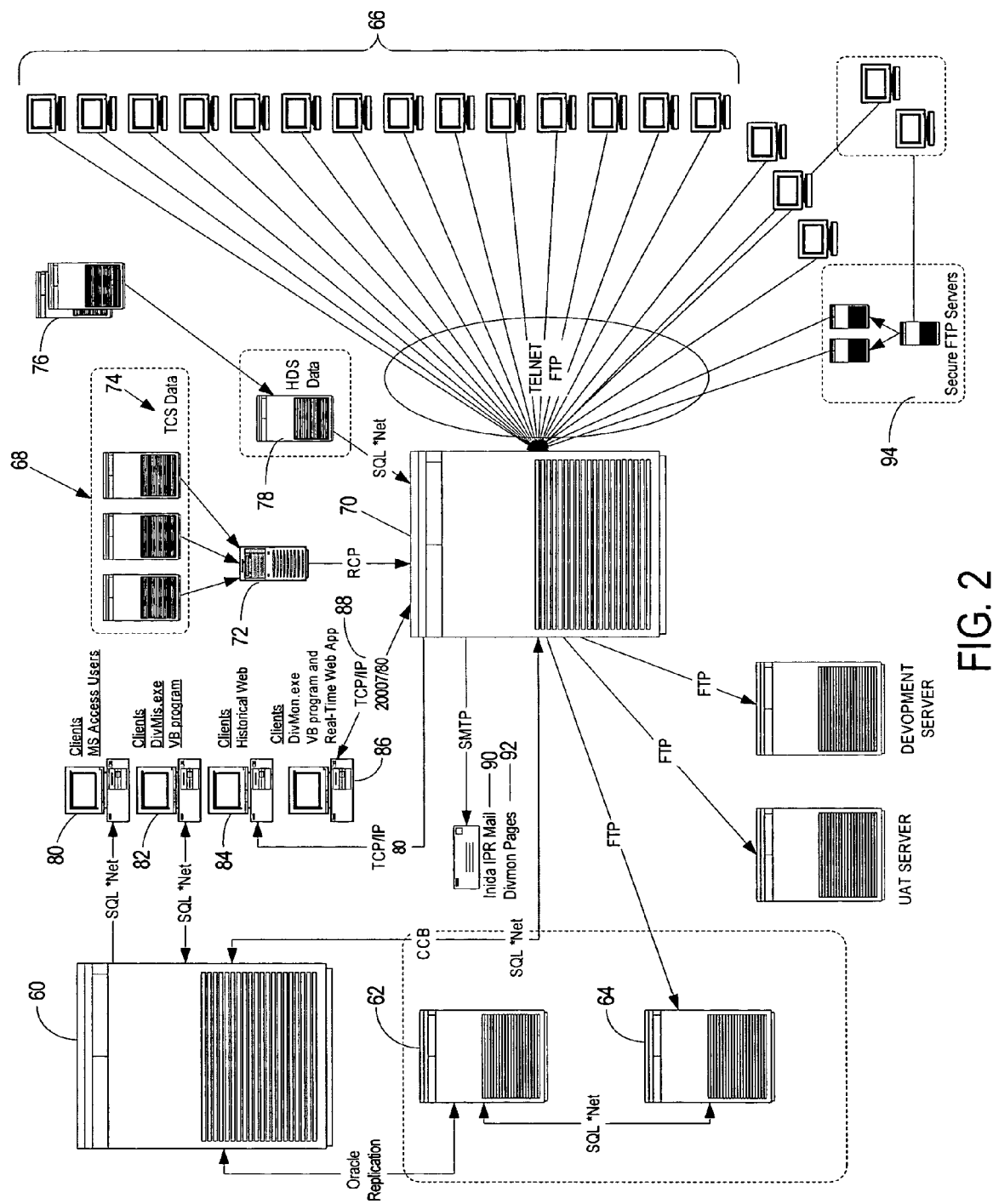
FIG. 2 is a schematic flow diagram that illustrates an overview example of key components and the flow of information between the key components of the division monitor system for an embodiment of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

Embodiments of the invention propose a method and system for management of real-time and historical data for multiple call centers referred to as the division monitor system. FIG. 1 is a sample GUI screen 10 displaying data received from both TCS and CMS for multiple different call centers and merged into a single screen window for an embodiment of the invention. In an embodiment of the invention, the division monitor system pulls data from both TCS and CMS and merges the data into a single window or screen 10, as shown in FIG. 1. In the past, it was possible to log in separately to each one of multiple different CMSs for multiple different call centers, but the information presented for each call center did not include or integrate data from TCS.

The sample GUI screen 10 of FIG. 1 illustrates an example of a real time view for customer service for an entity at mid-afternoon. Across the top of the screen from left to right is a row of column headings representing, for example, eleven different call center sites, beginning with 'CITI-DE' or Delaware, 'CITI-JX' or Jacksonville, 'CITI-KY' or Kentucky, 'CITI-MD' or Maryland, and so on. The column heading 'CITI-DIV' 12 at the far right represents the division, which integrates the data from the other eleven columns. Proceeding down the column at the far left, the first row "Site" 14 simply refers to the designations for the call centers. The next row 'Calls Offered' 16 shows the number of calls that have been offered so far during the current half hour interval for each one of the individual call center sites, with a total in the far right column under the 'CITI-DIV' or division heading 12, which value comes from CMS systems.

Referring further to FIG. 1, another row called 'Forecast This Half' 18 shows the number of calls that were forecast for the current half hour, which appears only in the column under the 'CITI-DIV' or division heading 12, which value comes from TCS systems. The next two rows, 'Projected Vol This Half' 20 and 'Projected Vol O/U Fcst' 22, show values that are calculations performed by the division monitor system. The 'Projected Vol This Half' row 20 shows the projected volume of calls for the current half hour at the present rate at which calls are being received, and the 'Projected Vol O/U Fcst' row 22 shows the difference between the number of calls forecast for the current half hour and the projected volume of calls at the present rate as a percentage.

Referring again to FIG. 1, the following row called 'Staff Logged On' 24 shows the number of agents that are present at each of the sites actually taking calls, which comes from CMS systems. The next row, 'Scheduled Staff' 26, is a value that comes from TCS systems, which is the number of agents according to TCS that are supposed to be currently logged in at each site. The row, 'Staff On vs Sched Variance' 28, is a calculation performed by the division monitor system that reports the difference between how many agents are logged on and how many were scheduled, and the row 'Staff Variance %' 30 presents that difference calculated as a percentage. The 'Base Staff Available' row 32 shows the number of staff at each site that are currently logged on and awaiting the next call, which comes from CMS. The next row, 'Scheduled Off' 34, comes from TCS and shows the number of agents at each site that are not scheduled to be taking calls and may be doing paperwork, training, or the like, instead.

Referring once more to FIG. 1, the 'Forecast Update Time' row 36 is a 'time stamp' of the time at which the most recent feed was received by the division monitor system from TCS. In other words, it illustrates the last time either a schedule or forecast change was made within TCS for each site or for the division. The next row, 'ASA' 38, shows the average speed of call answering (i.e., how long customers are waiting) for each site, which comes from CMS. The following row, 'Calls in Queue/Pct in Q' 40, shows the number of calls that are currently in queue for each site, and in the CITI-DIV or division column 12 is shown the total percentage of calls that are currently still in queue, which comes from CMS.

Referring once again to FIG. 1, the row 'Oldest Call Waiting' 42 is the time in seconds that the oldest call has been in queue, which comes from CMS. The 'Handle Time' row 44 shows the average actual call handle time for each of those sites for the current half hour interval, which comes from CMS. The row, 'Forecast Handle Time' 46, which comes from TCS, presents a forecast of the call handle time for all sites. The 'Data Line Read/Combine Time' row 48 is the division monitor server clock that shows when the information displayed on the screen was compiled for each site, and the 'CMS Timeclock' 50 is actually from the CMS time clock and illustrates how close the CMS clock for each site is to being in synchronization with the other sites.

Referring further to FIG. 1, in the upper left area of the screen is a drop-down list designated 'Citi' 52 which provides numerous views (e.g., 60 or 70 different views) related, for example, to customer service and sales, such as whether the customer's account is in good standing, whether any recent offers have been made to the customer by phone, and other sales-related criteria, which can be used by agents to make offers to customers who call, such as a balance transfer offer or some type of add-on offer for customers' card accounts. Other drop-down views relate, for example, to assistance for an agent in dealing with a hostile caller. The view may show a group of supervisors which the agent can conference in or to whom the agent can route the call when that situation arises. A portfolio collection available from the drop-down list relates to business and/or business card accounts, such as MasterCard, Visa, and various private label credit cards, such as Home Depot or Radio Shack. In an aspect of the present invention, the selection of views that are made available from the drop-down list is driven, for example, by needs of the particular business, and the business can propose the type or types of screens available from the drop-down list.

FIG. 2 is a schematic flow diagram that illustrates an overview example of key components and the flow of information between the key components of the division monitor system for an embodiment of the invention. On the left side of FIG. 2, for example, are a production database server 60, a continuity of business database server 62, and a continuity of business application server 64, and on the right side of FIG. 2 are the CMS systems collectively 66. In an embodiment of the invention, source information comes from the CMS systems 66 for various different sites. While the CMS systems are illustrated on FIG. 2 by symbols that appear as monitors, each CMS system actually comprises a substantial server available commercially, for example, from Avaya.

At the top center of FIG. 2 depicted as three servers surrounded by a dotted line is a main data source for an embodiment of the invention, which include the TCS servers or systems 68 from which the TCS data is received by the division monitor system. As previously described, the TCS data comprises, for example, forecasts, and the TCS servers 68 have the actual agent schedules on them. Toward the bottom center of FIG. 2 is a production application server 70, which is the main server that can be characterized as the heart of the division monitor system for an embodiment of the invention. In order to get the real-time CMS information from the CMS systems 66, a customer program running on the main server 70 telnets to each of the CMS systems 66 multiple times. Like a robotic user, it telnets into each CMS system 66 and navigates to a specific report that is created specifically for the purpose.

Referring again to FIG. 2, multiple real-time reports are run on the CMS system 66 for each site. Since a program is performing the task, the program actually navigates to the report, running it with typically a 20 second refresh interval, reads from the screen, and updates stored or shared memory on the production server 70. In other words, imagine an array of information on the production server 70 and the individual programs that are telnetted to each CMS 66. Each time information changes on one of the screens, the shared memory is updated, so that it is the same (or as close as possible to being exactly the same) as what the current status is. In another aspect, on each CMS system 66 is provided a job that sleeps until the end of each half hour interval, at which time it awakens and pulls data from the historical database on each CMS system 66 and sends a text file via file transfer protocol (FTP) back to the main server 70. Thus, for example, the historical information is received every 30 minutes.

Another server 72 depicted on FIG. 2 between the TCS servers 68 at the top center of FIG. 2 and the main server 70 near the bottom center of FIG. 2 has custom programs running in a loop that access a database of each one of the TCS systems 68 searching for specific information about the forecasts and agent schedules. Forecast and agent schedules are processed, grouped, and then put together into a format defined by the main server 70. Thus, the information that comes from the TCS system 68 and appears on the real-time GUI screen depicted in FIG. 1 is obtained by this program going out and basically running the same queries over and over again against the TCS systems 68.

The particular program keeps a copy of what it found on the last occasion, and if there is a change, the program sends a change file via remote copy protocol (RCP) to the main server 70. That is the source for the TCS time stamp on the Forecast Update Time 36 of the GUI screen 10 of FIG. 1. There are two types of files, one of which is the division forecasts 'Forecast This Half' 18 and 'Forecast Handle Time' 46 in the right hand column on the GUI screen of FIG. 1, and the other of which is 'Scheduled Staff' 26 for each site, which change throughout the day. In the latter case, for example, if a certain number of agents are supposed to be logged on for the day, one of whom calls in sick, someone at the control desk changes the TCS system 68, and the program picks up the change, usually within about five minutes, so the TCS information is not as real-time as the CMS information.

The TCS information arrives on the main server 70, and two different programs look at the information. One of the programs continually updates the shared memory array with real time information as discussed above, and the other program puts the information into a database for historical reporting. As described earlier, a process running, for example, every half hour transfers a file using FTP from each CMS system 66 to the main server 70. However, those files are not used for real-time reporting but are found by another program that puts them into a production database server 60 as shown on FIG. 2. In addition, everything that happens at the production database server 60 is forwarded to the continuation of business database server 62, for example, at another location, which is thus a few minutes behind the production database server 60 but which can replace the primary production database server 60, if necessary. Likewise, the continuation of business application server 64 is also available for service if necessary.

Another source of TCS data is a component below the TCS servers 68 on FIG. 2 labeled 'TCS Data' 74 and enclosed within a dotted line. The particular source is married out in a different way and has other reports running from it on the historical side that are presented on another screen that is different from the GUI screen depicted on FIG. 1. A further source of information is computer telephony integration (CTI). As calls are routed to different sites to be answered by agents, information about the call, such as the customer's account number and the like, are also passed to the site. Thus, when a customer service agent answers the call, information, such as the customer's account number and a list of names on the account, are displayed on a screen for the agent. Therefore, it is not necessary for the customer to repeat his or her account number to the agent, as the agent already has that information as he or she receives the call. All of that information is stored in an HDS server 76 at the top right of FIG. 2.

An embodiment of the invention provides a feed for such information to the server shown within a dotted line and labeled "HDS Data" 78 on FIG. 2. Tables are designed and stored on the HDS Data server 78 from which reports can be run and information about calls can be seen. The particular system has a number of clients that are the same as the division monitor system clients, and the front end reports are added to make them available through division monitor. The addition is advantageous because, for example, those calls are basically the same calls that are counted with the data from the division monitor system, but provide different types of information from a different source. For example, information is received from that source, such as the account numbers of the customers who called, the identification of the agents who answered the calls, and the like.

Referring again to FIG. 2, depicted to the left of the 'TCS Data' server 68 are four components labeled respectively 'Clients MS Access Users' 80, 'Clients DivMis.exeVB program' 82, 'Clients Historical Web' 84, and 'Clients DivMon.exe VB program and Real-Time Web App' 86. The 'DivMis.exe VB program' 82 and 'DivMon.exe VB program' 86 are legacy programs utilized for an embodiment of the invention. The components labeled 'Clients, Historical Web' 84 and 'Clients DivMon.exe VB program and Real-Time Web App' 86 are actually a single component of an embodiment of the invention. Thus, rather than two different applications installed on a user's client machine, the two components represent a functionality on each client machine for access to both historical and real time information.

In an embodiment of the invention, the designation 'TCP/IP 20007/80' 88 indicates that the client 86 connects to the main server 70, for example, on port 20007, and a custom program running on the server 70 is implemented and remains until the user logs out. The custom program sends information continually, for example, to refresh every 20 or 30 seconds. The designation '/80' refers to the standard browser port used by the historical site. The component labeled 'MS Access Users' 80 can be used by groups in the business side or MIS users who may have other ad hoc reasons and manually intensive processes they perform to develop other reports. For example, they may connect using Microsoft Access and pull raw data for their own purposes.

Referring once more to FIG. 2, the components depicted to the left of the main server and designated 'SMTP India IPR Mail' 90 and 'Divmon Pages' 92 are two different components. Email messages are sent from the main server 70, one of which is a main historical report called interval performance report (IPR). That report is updated every half hour to show what has happened, and within a short time, such as about five minutes before the end of the half hour, it is updated. The IPR is for personnel without access to the division monitor system to which information similar to the screen depicted on FIG. 1 is sent by email, except that it shows every half hour so far for the particular day. Thus, such personnel receive a summary of each prior interval. The component labeled 'Divmon Pages' 92 refers to a schedule for certain high level information that goes to site directors, a control desk, and special users that provides a snapshot of the day so far that tells them, for example, how they are performing for the day, whether they are meeting their service levels or not, and the like. The component located to the lower right of the main server 70 between the CMS systems 66 and the main server 70 labeled 'Secure FTP Servers' 94 within a dotted line represent, for example, firewalls.

An aspect of the division monitor system for an embodiment of the invention include, for example, a browser-based user interface that provides real-time information from the division monitor system, which eliminates the need for every end user to have a separate application installed on his or her PC. With the browser-based user interface, a user needs only a browser, such as the Internet Explorer browser. Other aspects of the division monitor system are reports which pull data from the CTI database that is stored on the HDSP database 78 after being extracted daily from the HDS server 76. Thus, in addition to the CMS and TCS systems 66, 68 as sources for data, the CTI system is another source of information for the division monitor system.

Additional aspects of the division monitor system for an embodiment of the invention include, for example, a notes recording and reporting system that allows a control desk user to enter notes into the division monitor system about the major events for each day, which can be retrieved by date and call-type. Further aspects include configurations which enable dynamic service level reporting, as opposed to reports that assume service levels are fixed at a pre-determined percentage of calls answered within a certain number of seconds, which recognizes that different types of call can have different service levels.

Still further aspects of the division monitor system for an embodiment of the invention include, for example, a real-time interface between the division monitor system and the respective CMS systems 66. Additional aspects include sending historical files by all CMS systems 66 to a secure FTP server 94, which then forwards the files to the DivMon server 70, instead of going directly from CMS 66 to the DivMon server 70 through a firewall at each site. Another aspect is the establishment of a begin/end time for a day from midnight-to-midnight, for example, Eastern Time.

Still additional aspects of the division monitor system for an embodiment of the invention include, for example, a drill down capability for real-time, whereby users can click on the site name, and the DivMon component breaks out a site and displays the skills which make up the data for the particular site. Users can then click on one of the skills and drill down further to show the agents that make up that skill. Another aspect includes secure email work queues as another major source of information for the division monitor system. For example, there are agents who pull email messages and reply to customers. Such agents have a turnaround target, and the business is interested in knowing the number of emails that are in queue, the average turnaround time, and the like. This aspect is another source of information in addition to the CMS, TCS, and CTI systems. Still another aspect of the division monitor system for an embodiment of the invention is another layer of configuration to make it easy to isolate different businesses from one another, instead of showing businesses together.

Figure 3:
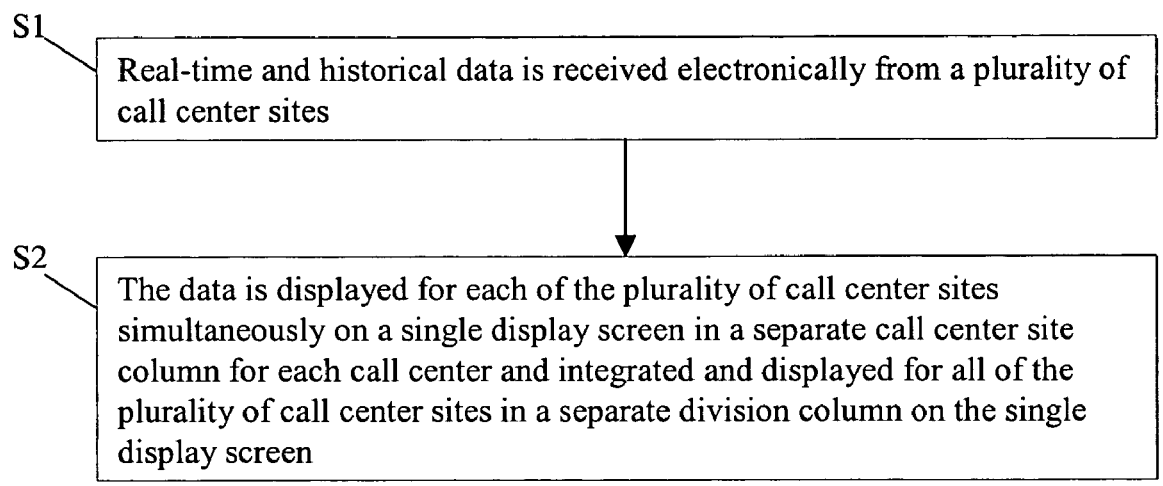
FIG. 3 is a flow chart which illustrates and example of the process of managing real-time and historical data for multiple call centers for an embodiment of the invention.

FIG. 3 is a flow chart which illustrates an example of the process of managing real-time and historical data for multiple call centers for an embodiment of the invention. Referring to FIG. 3, at S1, real-time and historical data is received electronically from a plurality of call center sites, and at S2, the data is displayed for each of the plurality of call center sites simultaneously on a single display screen in a separate call center site column for each call center and integrated and displayed for all of the plurality of call center sites in a separate division column on the single display screen.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A tangible computer-readable medium encoded with program code for management of real-time and historical data for multiple call centers, comprising;

receiving real-time and historical data electronically from a plurality of call center sites; and displaying data for each of the plurality of call center sites simultaneously on a single display screen in a separate call center site column for each call center and integrating and displaying the data for all of the plurality of call center sites in a separate division column on the single display screen;

wherein the displayed data comprises:

a number of calls offered during a current pre-determined time interval for each site and a total number of the calls offered for all sites, a number of calls forecast for a current interval, a projected volume of calls predicted at a current rate for the current interval, a difference between the number of calls forecast and projected volume of calls for the current interval for each site and a total number of calls forecast and projected volume and total difference for the current interval for all sites, a number of agents logged on at each site and a total number of the agents logged on at all sites, a number of agents scheduled to be logged on at each site and a total number of the agents scheduled at all sites, a difference between the number of agents logged on and scheduled to be logged on for each site, and a total difference between the number of agents logged on and scheduled to be logged on for all sites, a number of agents currently logged on and awaiting a next call at each site and a total number of staff currently logged on and awaiting a next call at all sites, a number of agents at each site that are not scheduled to be logged on and a total number of agents at all sites that are not scheduled to be logged on, a 'time stamp' for a most recent feed from a forecasting system for each site and for a most recent feed from any site, an average speed of call answering for each site, a number of calls currently in queue for each site, and a percentage of all calls that are currently in queue, a time in queue for an oldest call for each site, an average call handle time for each site for the current interval, and a forecast of a call handle time for all call center sites, and a server clock showing a time that displayed information was compiled for each site and a call management system clock for each site illustrating a degree of synchronization between call management systems for all sites.

* * * * *